(12) United States Patent
Hung et al.

(10) Patent No.: US 7,633,693 B2
(45) Date of Patent: Dec. 15, 2009

(54) RETRACTABLE LENS AND SLIDABLE LENS RETRACTING DEVICE THEREOF

(75) Inventors: Tun-kuei Hung, Tantz Shiang (TW); Rueyder Wu, Tantz Shiang (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 12/180,414

(22) Filed: Jul. 25, 2008

(65) Prior Publication Data

US 2009/0027786 A1    Jan. 29, 2009

(30) Foreign Application Priority Data

Jul. 27, 2007    (TW)    .............................. 96127416 A

(51) Int. Cl.
*G02B 7/02* (2006.01)
*G03B 17/00* (2006.01)

(52) U.S. Cl. ..................... 359/826; 359/813; 359/823; 359/694; 359/701; 396/73; 396/75; 396/79; 396/85; 396/349

(58) Field of Classification Search ................. 359/813, 359/822, 823, 825, 826, 830, 694–704; 396/72, 396/73, 75, 79, 85, 132, 144, 345, 348, 349, 396/395, 448, 529; 720/658
See application file for complete search history.

(56) References Cited

U.S. PATENT DOCUMENTS

| | | | | |
|---|---|---|---|---|
| 7,304,806 | B2 * | 12/2007 | Huang | ......................... 359/694 |
| 2008/0310034 | A1 * | 12/2008 | Huang et al. | ................. 359/817 |

* cited by examiner

*Primary Examiner*—Loha Ben

(57) ABSTRACT

A slidable lens retracting device is provided for retracting a lens system that include lens group units all positioned on a common optical axis when the lens system is in an operational state. At least one lens group unit is retracted from the on-axis position on the optical axis to an off-axis space radially off the optical axis by the slidable lens retracting device when the lens system is moved to a retracted state. The slidable lens retracting device includes slides mounted to the lens group unit and fixed support members forming inclined surfaces with which the slides are engageable. The control tracks receive the slides therein and are movable along the optical axis to bring the lens system to the retracted position to cause the slides to engage and slide along the inclined surfaces and thus moving the lens group unit to the off-axis space.

13 Claims, 6 Drawing Sheets

RETRACTABLE LENS AND SLIDABLE LENS RETRACTING DEVICE THEREOF

BACKGROUND OF THE INVENTION

1. Field of the Invention

The present invention relates to a retractable lens system that comprises a slidable lens retracting device with which at least one optical element of the retractable lens system slides off an optical axis of the lens system when the retractable lens is retracted.

2. Description of Prior Art

Retractable lens systems are commonly applied in cameras or other optical devices for reducing the overall size of a camera in a non-photographing condition. The camera incorporating the retractable lens has the advantages of compactness and improved portability. Conventionally, a retractable lens comprises a plurality of optical elements, such as lenses, of which one or more optical elements are movable along a common optical axis for retraction. Therefore, as shown in FIG. 1, when such a retractable lens system is fully retracted, all the optical elements or lenses are stacked along the optical axis and the minimum overall length of the lens system that can be achieved along the optical axis in the retracted condition is at least equal to the sum of the thicknesses of all the optical elements. It is impossible to make the overall retracted length of the retractable lens system smaller than the sum of the thicknesses of all the optical elements. Accordingly, there is no way to further reduce the overall size of a camera employing such a conventional retractable lens system.

U.S. Patent No. 2006045517 discloses a retractable lens camera including a displacing unit. At least two lens groups are swung and displaced by the displacing unit to an escaping space off an optical axis for minimizing the retractable lens. However, swinging of the lens groups into/off the optical axis makes the operation and assembling of the lens groups unstable, often leading to damage thereof. Further, structural instability may also be resulted in other parts of a camera that employs such a retractable lens due to swinging of the optical elements.

U.S. Pat. No. 6,031,998 discloses a digital camera comprising at least two lens groups of which a rearmost lens group is movable out of a photographing light path by an image pickup unit moving device swinging in a non-photographing condition of the digital camera. The rearmost lens group can move back into the photographing light path in a photographing condition. For the same reasons stated above, the rearmost lens group is likely to be subjected to the instability problem and such as problem leads to deterioration of quality and operation of the camera.

Accordingly, to overcome the problems present in the known techniques, it is desired to provide a retracting device that effectively reduces the overall size of a compact retractable lens in a non-operational condition, while maintaining a stable structure and good optical quality.

SUMMARY OF THE INVENTION

An objective of the present invention is to provide a retractable lens system comprising a slidable lens retracting device for steadily extending out and retracting back the retractable lens system by stably guiding and moving an optical element of the retractable lens system to an off-axis position that deviates from a common photographing optical axis of the retractable lens system at the time when the retractable lens system is being retracted, so that the retractable lens system may have a minimum along-axis dimension (or thickness) and a compact structure in a fully retracted state, and has an extended lifespan.

Another objective of the present invention is to provide a slidable lens retracting device that is applicable to a retractable lens system for retracting an optical element of the lens system to a position deviating from a common photographing optical axis of the retractable lens when the retractable lens is retracted, so as to obtain a compact retracted configuration of the retractable lens system.

A further objective of the present invention is to provide a lens retracting device that operates to retract a retractable lens system by guiding a lens of the lens systems off the optical axis with a simple structure and steady sliding movement.

To achieve the above objectives, in accordance with the present invention, a retractable lens system comprises a plurality of optical elements all positioned on a common optical axis to constitute an optical system in an operational state of the retractable lens system, a support member having an inclined surface for guiding at least one optical element to be retracted from an on-axis position of the common optical axis to an off-axis space radially off the common optical axis when the retractable lens system is moved from the operational state to a retracted state, and a control track member that is movable along the common optical axis and has a sliding passage extending along the radial direction of the common optical axis to control the sliding position of the optical element on the inclined surface.

The inclined surface is formed on a board that is mounted to a fixed base that carries an optical sensor.

The control track member has two opposite sliding passages both extending along the radial direction of the common optical axis. The lens housing forms two slide blocks respectively and movably received in the two sliding passages.

To further achieve the above objectives of the present invention, a slidable lens retracting device is provided for a retractable lens system of a camera which has a fixed base, at least one lens barrel movable along a common optical axis, and at least one lens group unit mounted in the lens barrel and slidable to an off-axis space outside the common optical axis as being guided by the slidable lens retracting device. The slidable lens retracting device according to the present invention comprises at least one slide block, at least one biasing element, at least one support member and at least one control track member. The slide block is formed on the lens group unit for moving the lens group unit away the common optical axis. The biasing element is connected between the lens group unit and the lens barrel. The support member has a first edge set on the fixed base of the camera and a second edge away from the fixed base and forming an inclined surface that is inclined with respect to the common optical axis to guide sliding movement of the slide blocks thereon. The control track member is formed on the lens barrel of the camera and has a sliding passage extending along the radial direction of the common optical axis to control the sliding position of the slide blocks on the inclined surface of the support member.

The present slidable lens retracting device can drive at least one optical element to slide along an inclined surface and to be retracted from an on-axis position of the common optical axis to an off-axis space radially off the common optical axis when the retractable lens system moves from the operational state to a retracted state. The sliding motion of the retractable optical element is steady and precise thereby overcoming the disadvantages of the known swinging type structure. Moreover, because the retractable lens system of the present invention further comprises a control track member having a sliding passage, the configuration of the sliding passage can be simply modified to change the space between the retractable optical element and a shutter member if desired. Consequently, more shutter members having different sizes can be independently applied in the retractable lens system of the present invention.

BRIEF DESCRIPTION OF THE DRAWINGS

The present invention may best be understood through the following description with reference to the accompanying drawings, in which.

DETAILED DESCRIPTION OF THE PREFERRED EMBODIMENTS

Figure 1:
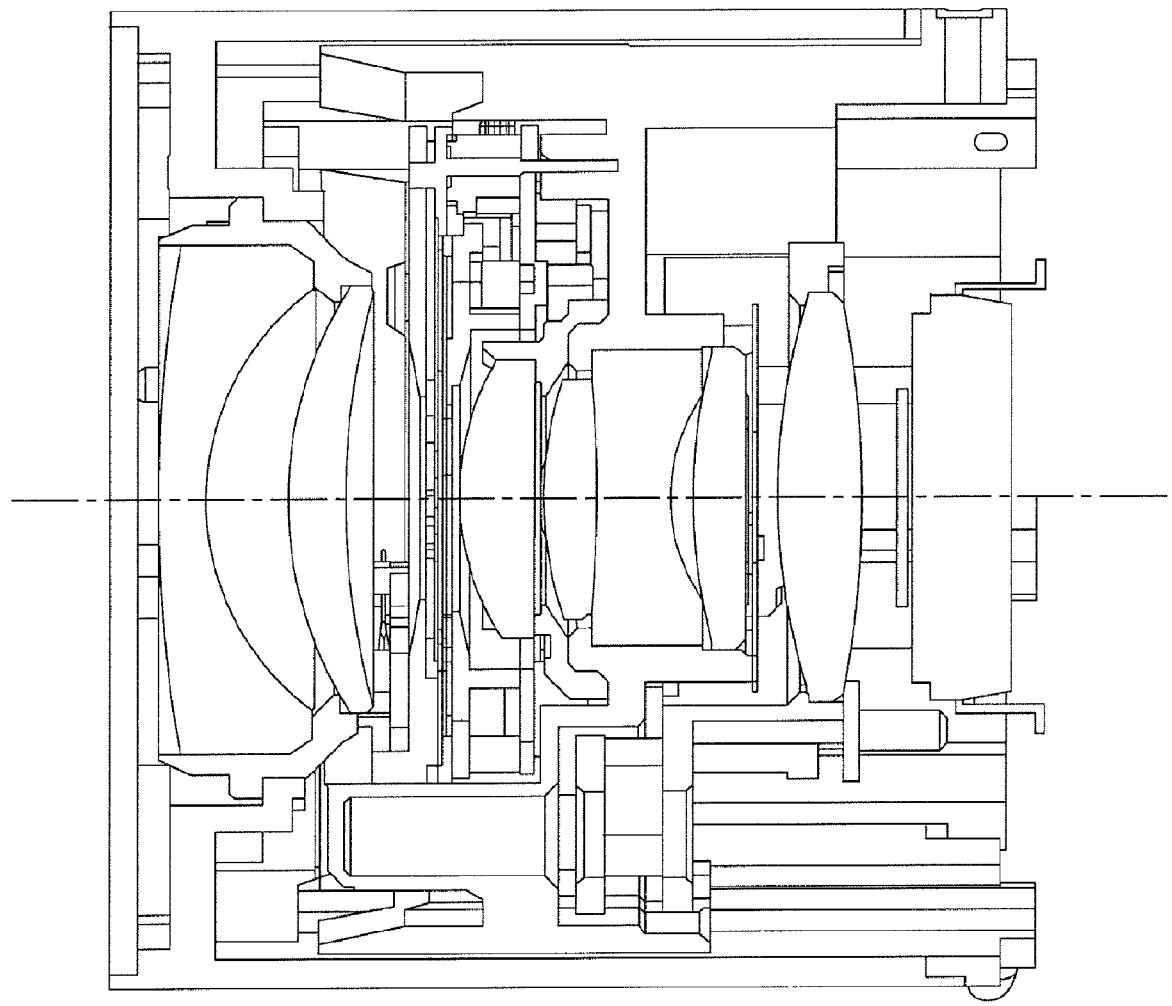
FIG. 1 is a cross-sectional view of a camera incorporating a conventional retractable lens system, showing all lens groups of the conventional retractable lens system are aligned and stacked along a common photographing optical axis in a retracted state.
Figure 2:
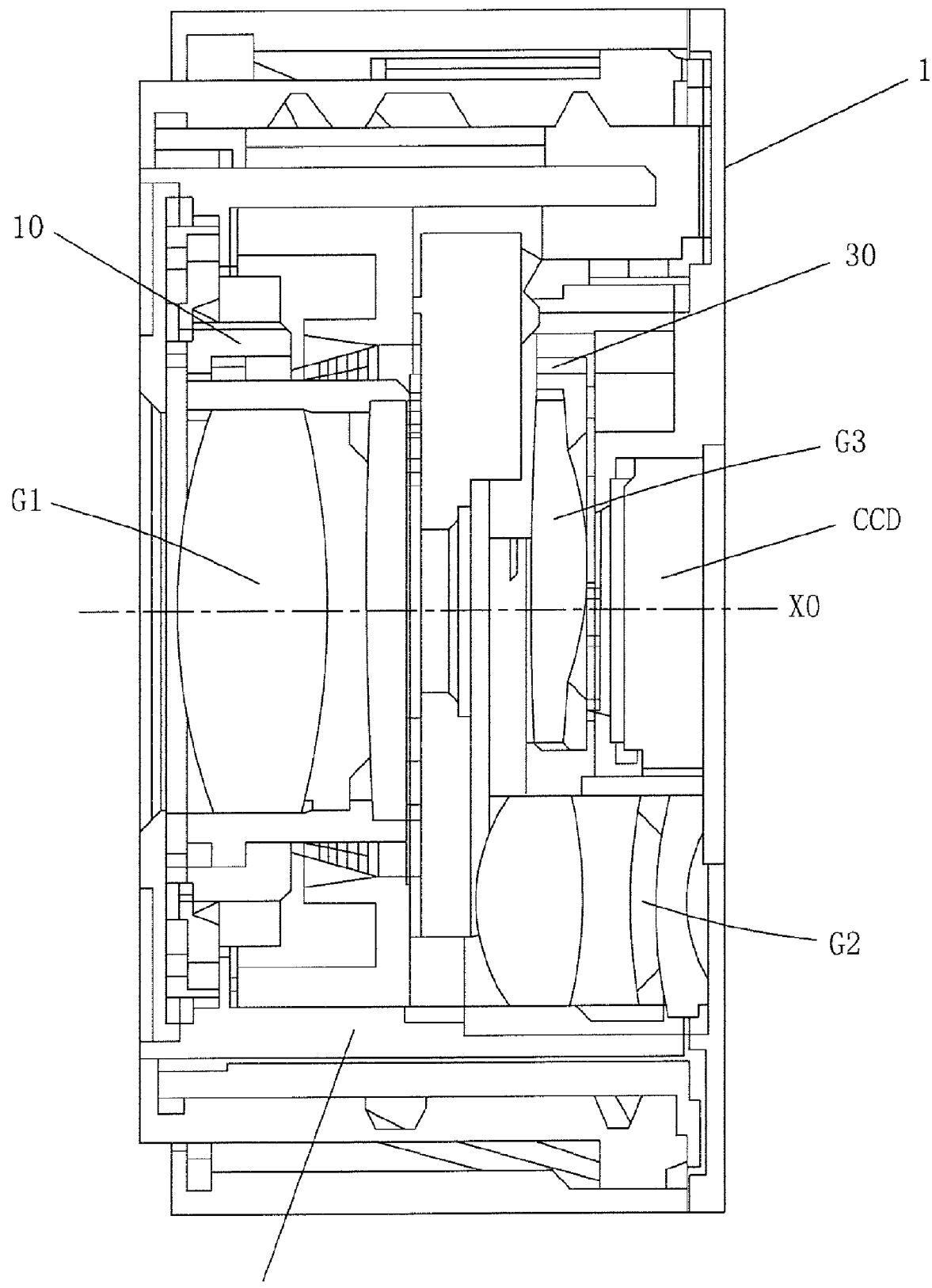
FIG. 2 is a cross-sectional view of a camera incorporating a retractable lens system in accordance with the present invention, showing a second lens group is moved sideways to a retracted position deviating from a common photographing optical axis in a retracted state of the retractable lens system.

With reference to the drawings and in particular to FIG. 2, which shows a schematic side elevational view illustrating a camera 1 comprising a retractable lens system in accordance with the present invention in a retracted, non-operational state, the retractable lens in accordance with the present invention comprises a plurality of optical elements, including a first lens group G1, a second lens group G2, and a third lens group G3 and further comprises a charge-coupled device (CCD). In the non-operational state shown in FIG. 2, the first lens group G1, the third lens group G3 and the charge-coupled device (CCD) are aligned on a common photographing optical axis X0 of the retractable lens system, while the second lens group G2 is displaced off the common photographing optical axis X0 to an off-axis space or location radially out of the common photographing optical axis X0 for making the camera 1 compact. On the other hand, in an operational state, which is not shown in figures, all the optical elements, including the first lens group G1, the second lens group G2, the third lens group G3 and the charge-coupled device (CCD), are aligned along the common photographing optical axis X0 of the retractable lens system.

Figure 3:
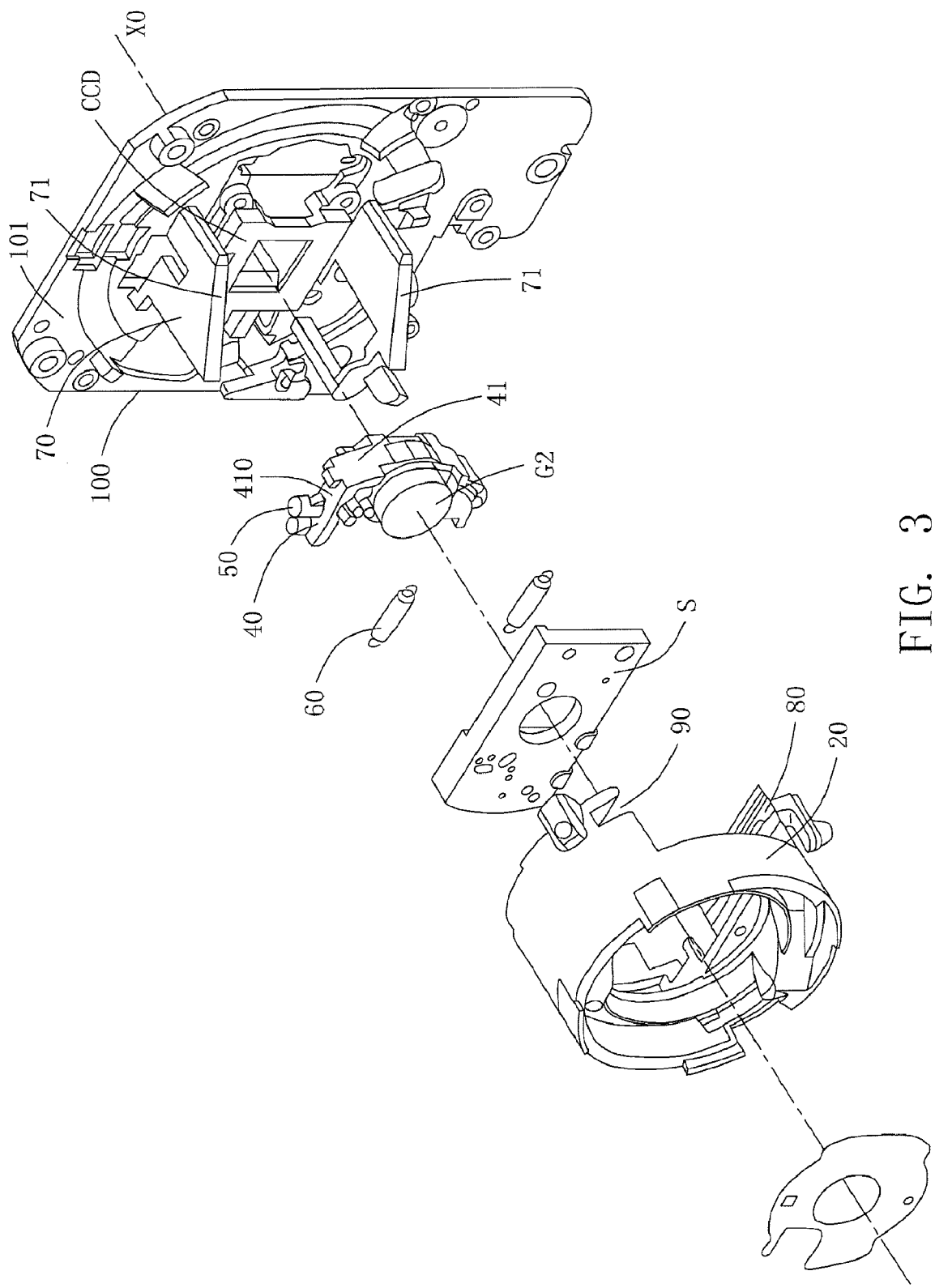
FIG. 3 is an exploded view illustrating a slidable lens retracting device constructed in accordance with the present invention.

Referring to FIGS. 2 and 3, in a preferred embodiment of the present invention, the camera 1 to which the retractable lens system in accordance with the present invention is applied comprises a fixed base 100, first, second and third lens barrels 10, 20, 30, and a shutter member S. The fixed base 100 carries and supports a sensing device, such as the charge-coupled device (CCD). The first, second and third lens barrels 10, 20, 30 are movable along the common photographing optical axis X0 for zooming of the retractable lens system. The shutter member S is mounted in the second lens barrel 20. The camera 1 also comprises first, second and third lens group lens group assemblies or units, which are respectively constituted, in part, by the first, second, and third lens groups G1, G2, G3. It is noted that, in the drawings, only the second lens group unit is specifically labeled with reference numeral 40 (see FIG. 3), while the first and third lens group units are not labeled. The first, second and third lens group units are respectively mounted in the first, second and third lens barrels 10, 20, 30. Each of the lens group units includes a lens housing in which at least one lens group, such as the lens groups G1, G2, G3, is accommodated. For example, the second lens group unit 40 comprises a lens housing 41, which is movable in unison with the second lens barrel 20 along the common photographing optical axis X0 and is also radially displaceable with respect to the second lens barrel 20, and the second lens group G2 that is mounted in the lens housing 41.

In accordance with the present invention, the second lens group unit 40 is slidable or movable with respect to the second lens barrel 20 to an off-axis space radially outside the common photographing optical axis X0 by means of a slidable lens retracting device.

As best seen in FIG. 3, the slidable lens retracting device in accordance with the present invention comprises two slide blocks 50, two resilient members 60, two support members 70, and two control tracks or rails 80, 90, which may also be referred to as first and second control tracks hereinafter when necessary. The two slide blocks 50 are substantially cylindrical in shape, having a circular outer circumference, and are symmetrically formed on opposite sidewalls 410 of the lens housing 41 of the second lens group unit 40. The two resilient members 60 are tension springs, such as helical springs, but can be any other resilient elements that provide a biasing force in a desired direction. Each resilient member 60 has a first end fixed to the second lens group unit 40 at 412 (see FIG. 4), such as a projection or a post 412 formed on the second lens group unit 40, and an opposite second end fixed to, for example, an inner wall of the second lens barrel 20 to thereby provide a biasing force between the second lens group unit 40 and the second lens barrel 20 in a direction that, in the embodiment illustrated, is substantially radial with respect to the common photographing optical axis X0. In the embodiment illustrated, the two support members 70 are formed of thin boards that are fixed to the base 100 of the camera 1 and extending substantially parallel to each other and perpendicular to a plane 101 of the base 100 that is normal to the common photographing optical axis X0. Each support member 70 has a first, proximal edge that is arranged on the plane 101 of the fixed base 100 and fixed to the base 100 and a second, distal edge that is located away from the plane 101 of the base 100 and forms an inclined surface 71, which is inclined with respect to the common photographing optical axis X0. The two control tracks 80, 90 are defined by slots or channels formed in the inner wall of the second lens barrel 20 and are thus movable in unison with the second lens barrel 20 along the common photographing optical axis X0.

Figure 4:
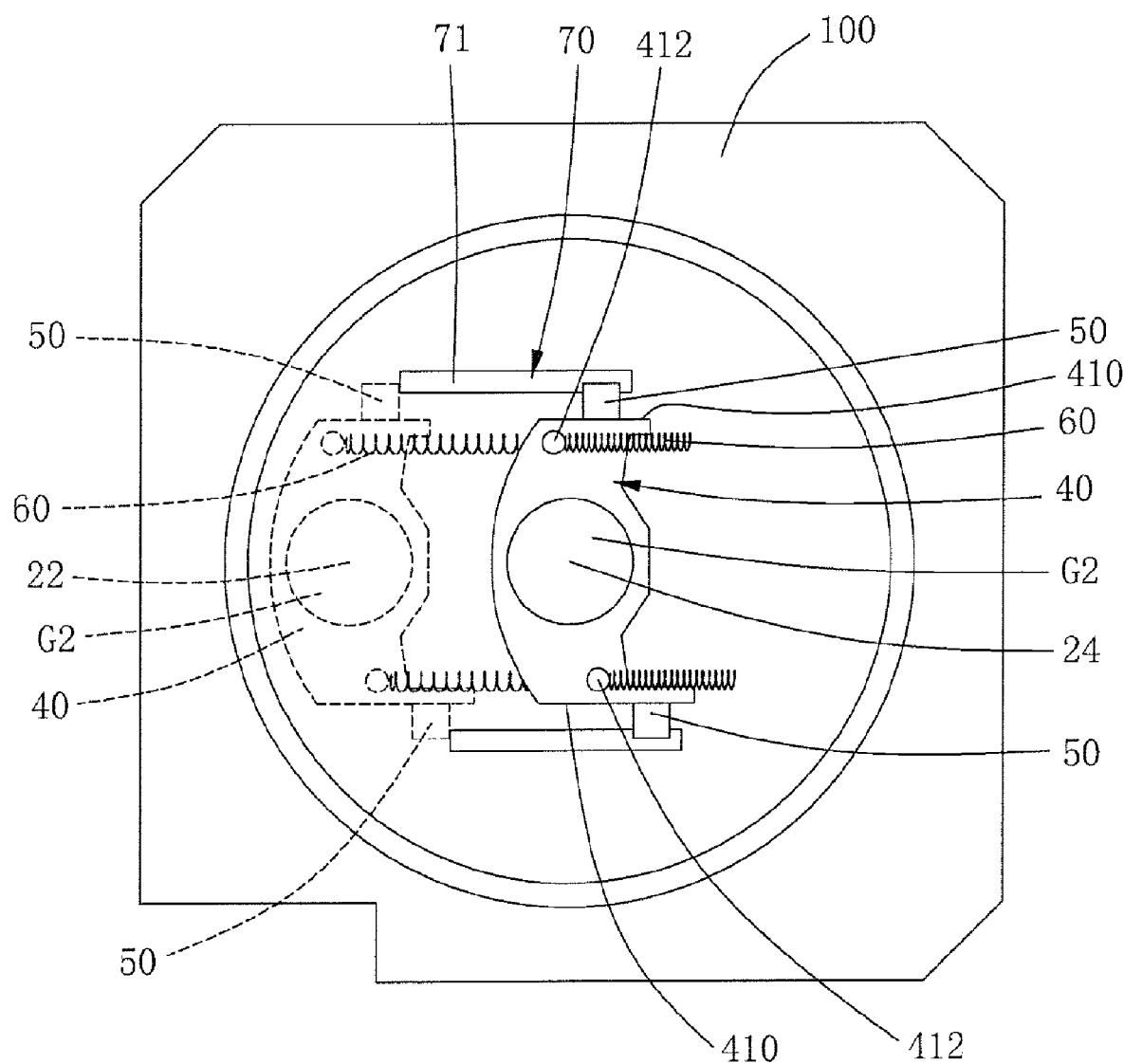
FIG. 4 is a schematic plan view illustrating positional transition of a lens group from an on-axis position shown in solid lines to a sideways retracted position shown in phantom lines by being guided by the slidable lens retracting device of the present invention.
Figure 5:
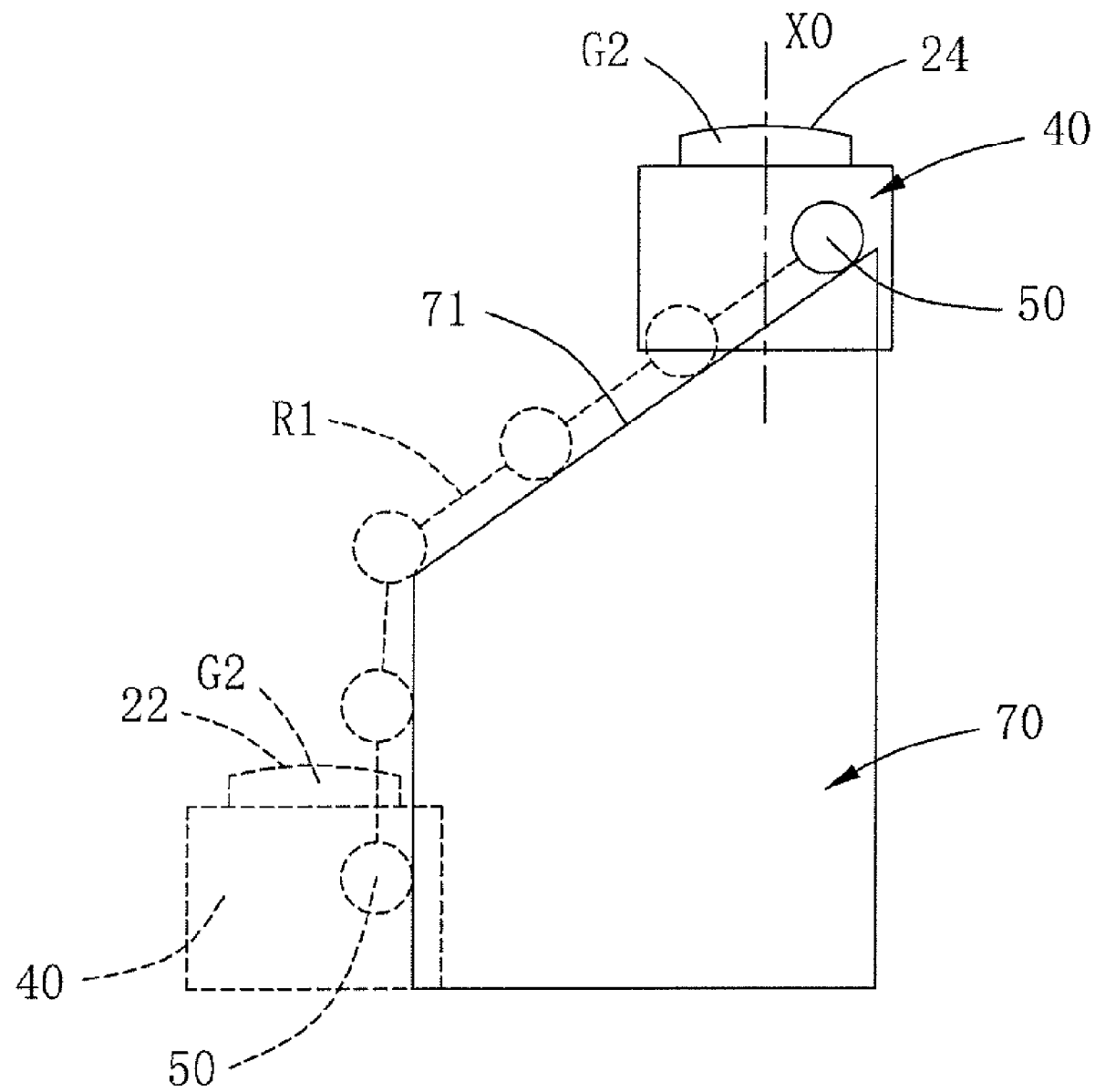
FIG. 5 is a schematic elevational view showing trace of a lens group as being guided by an inclined surface of a support member of the slidable lens retracting device, the lens group unit being guided to slide from the on-axis position shown in solid lines to the retracted position shown in phantom lines.

Also referring to FIGS. 3, 4 and 5, the slide blocks 50 of the second lens ground unit 40 are positioned and dimensioned so that when the second lens group unit 40 is moved, along with the second lens barrel 20, backward (namely in a direction toward the base 100) by a certain distance along the common photographing optical axis X0, the two slide blocks 50 of the second lens group unit 40 are brought into contact with the inclined surfaces 71 of the support members 70, respectively. The inclination of the inclined surfaces 71 provides a radial component of force acting on the slide blocks 50, whereby the slide blocks 50 are prevented from continuously and freely moving backward along the common photographing optical axis X0 are forced to slide along the inclined surfaces 71. As a result of the radial component of the force acting on the slide blocks 50 by the inclined surfaces 71, the second lens group unit 40, together with the second lens group G2, is radially displaced from an on-axis position 24 (solid lines of FIG. 4) to an off-axis position 22 (phantom lines of FIG. 4). Thus, after the slide blocks 50 are brought into contact with the inclined surfaces 71, the inclined surfaces 71 make the second lens group G2 radially displacing while the second lens group G2 is being farther moved backward with the second lens barrel 20.

Figure 6:
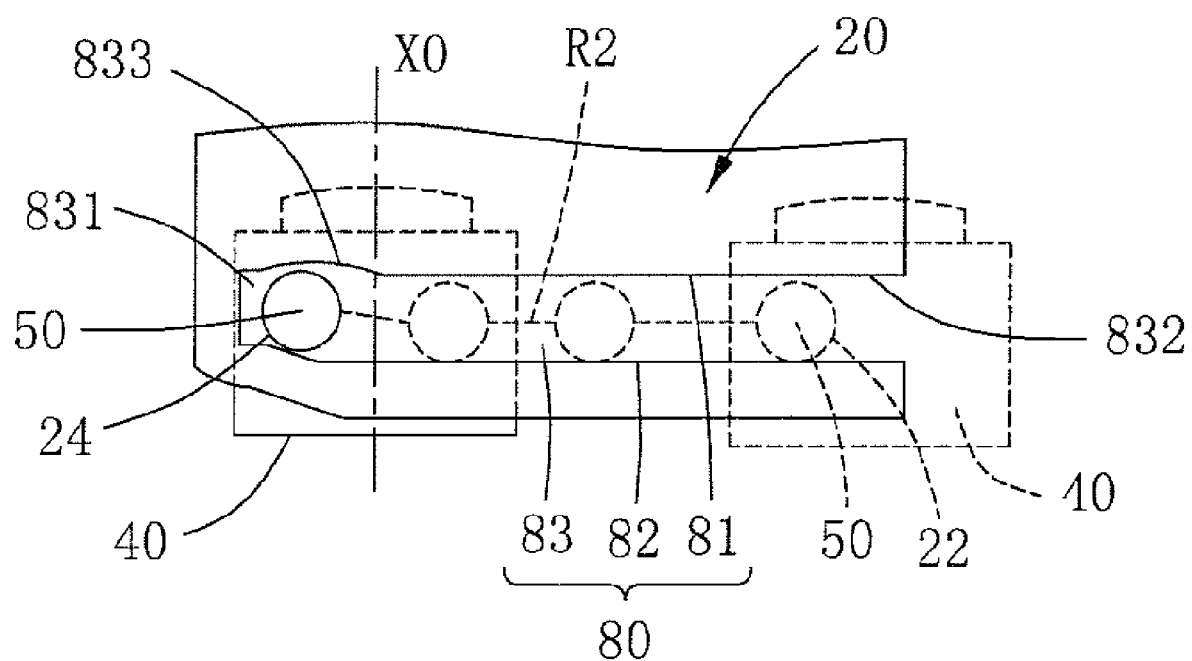
FIG. 6 is a schematic plan view illustrating trace of a lens group unit guided by a sliding passage of a control track that constitutes the slidable lens retracting device, the lens group being guided to slide from the on-axis position shown in solid lines to the retracted position shown in phantom lines.

FIG. 6 is a schematic view of the first control track 80. The first control track 80, as illustrated in FIG. 6, which is arranged in a drawing direction that is substantially perpendicular to FIG. 3, but consistent with FIG. 5, has a top surface 81, a bottom surface 82 and a sliding passage or channel 83 defined therebetween. The sliding passage 83 of the first control track 80 extends in a direction substantially parallel to a radial (transverse) direction with respect to the common photographing optical axis X0 (and thus substantially perpendicular to the axis X0) and functions to receive and guide the respective slide block 50 of the second lens group unit 40 to thereby control and guide the sliding position and movement of the slide block 50 with respect to the inclined surface 71 of the respective support member 70.

The sliding passage 83 has opposite ends 831, 832 in the direction of extension thereof and the end 831 is offset from the passage 83 in the axial direction defined by the optical axis X0 so that a different in axial position exists between the two ends 831, 832 of the sliding passage 83 in the direction of the common photographing optical axis X0. Similarly, the second control track 90 also forms a sliding passage (not labeled), which is opposite to the sliding passage 83 of the first control track 80, for receiving and guiding the other slide block 50 of the second lens group unit 40. It is, however, noted that, in the embodiment illustrated, the sliding passage 83 of the first control track 80 (best seen in FIG. 6) completely runs through the wall of the second lens barrel 20, forming a through slot, while the sliding passage (not labeled) of the second control track 90 (shown in FIG. 3) does not run completely through the wall of the second lens barrel 20.

FIG. 4 is a schematic plan view demonstrating transition of spatial relationship among the slide blocks 50, the resilient members 60, and the support members 70, when the second lens group unit 40 is retracted from the on-axis position 24 (solid lines) to the off-axis position 22 (phantom lines). As shown in FIGS. 3, 4 and 5, during the course of retraction of the retractable lens system in accordance with the present invention, the second lens barrel 20 and the second lens group unit 40 are together moved, from the operational state, backwards by a certain distance along the common photographing optical axis X0 to thereby bring the slide blocks 50 of the second lens group unit 40 into contact with the inclined surfaces 71 of the support members 70.

In an initial phase that the slide blocks 50 contact the inclined surfaces 71, the second lens group unit 40 is seated on uppermost (top) ends of the inclined surfaces 71 (see FIG. 5, solid lines) and is still located at the on-axis position 24 of the common photographing optical axis X; and the two resilient members 60 are set in a loosened or non-deformed (non-tensioned) condition, corresponding to the position shown in solid lines of FIG. 4. When the second lens barrel 20 is further moved backward along the common photographing optical axis X, the slide blocks 50 are guided by and slide along the inclined surfaces 71 to reach lowermost (bottom) ends of the inclined surfaces 71, which causes the second lens group unit 40 to leave off (by radial displacement) the common photographing optical axis X0 and arrive at the off-axis position 22 with respect to the common photographing optical axis X0; and the resilient members 60 are elastically deformed or set in a tensioned condition, corresponding to the positioned shown in phantom lines of FIG. 4. The path or trace that the second lens group unit 40 slides along the inclined surfaces 71 of the support members 70 is illustrated in FIG. 5, wherein the solid lines of FIG. 5 indicate the on-axis (photographing) position 24 of the second lens group unit 40, while the phantom lines of FIG. 5 shows the moving trace of the second lens group unit 40 and also indicate the off-axis (retracted) position 22 of the second lens group unit 40.

The retractable lens system in accordance with the present invention is convertible between a non-operational, retracted condition to an operational, photographing condition, and when the lens system is in the retracted condition, the resilient members 60 apply a biasing (or restoring) force to the second lens group unit 40. When the conversion of the lens system from the retracted condition to the photographing condition takes place, the second lens group unit 40 is caused to move to the photographing position by being acted upon by the resilient restoring force of the resilient members 60. The trace of the second lens group unit 40 in the course of restoring the photographing condition is exactly reversed to the trace that the second lens group unit 40 moves from the photographing position to the retraced position. Thus, no detailed description of the restoring trace of the second lens group unit 40 is needed herein.

In comparison with the prior art devices, the slidable lens retracting device in accordance with the present invention adopts a sliding mechanism that causes a lens group (the second lens group G2) to radially move off the common photographing optical axis, when the lens group is being moved to a retracted position, for reducing or eliminating the axial space that is occupied by the lens group. With at least a portion (the slide block 50) of an assembly (the second lens group unit 40) that carries the second lens group G2 being set in a constant contact and sliding engagement with an inclined guide (the inclined surface 71) during the course of radially displacing off the optical axis X0, the sliding movement of the second lens group unit 40 can be made very steady and precise thereby overcoming the disadvantages of unstable operation of the known swingable mechanisms.

Referring to FIG. 6, a preferred embodiment of the present invention will be further described with reference to the first control track 80 to demonstrate the sliding movement of the second lens group unit 40 in the sliding passage 83. The control track 80 is defined in the side wall of the second lens barrel 20 and has a first end 831 and an opposite, second end 832. The first end 831 is offset with respect to the passage 83 and thus the second end 832 along the common photographing optical axis X0 in a direction away from the base 100, so that, as shown in FIG. 6, the first end 831 is set at a location higher than the second end 832. When the camera 1 is in the operation condition and the second lens group unit 40 is set at the on-axis, photographing position 24, the slide block 50 of the second lens group unit 40 is located at the first end 831 of the sliding passage 83 and a space is maintained between the second lens group unit 40 and the shutter member S. (It is noted that both the second lens group unit 40 and the shutter member S are accommodated in the second lens barrel 20) When the camera is moved to the non-operation condition, the slide block 50 of the second lens group unit 40 is caused, at least in a portion of the movement of the camera 1, to slide from the top end of the inclined surface 71 to the bottom end thereof, and at the same time slides from the first end 831 of the sliding passage 83 to the second end 832 in order to radially displace the second lens group unit 40 to the off-axis, retracted position 22. In the retracted position of the second lens group unit 40, the space between the second lens group unit 40 and the shutter member S becomes larger because the second end 832 of the sliding passage 83 is lower than the first end 831 thereof. Consequently, the length (the axial dimension) of the retractable lens system of the present invention in the retracted condition does not need to change even though the retractable lens system is applied to a shutter member that has a greater aperture and a larger thickness.

In other words, the space between the second lens group unit 40 and the shutter member S is changed (increased) because the sliding passage 83 is set to have a difference in axial location between the two ends 831, 832 thereof. The range of specification of the shutter member applicable in the retractable lens system of the present invention is wide. Namely, if an original shutter member S of the lens system is replaced by another different shutter member having a different aperture and a different size, the configuration of the sliding passage 83 can be correspondingly altered, if necessary, to adjust the space between the second lens group unit 40 and the shutter member S in the retracted condition.

Moreover, the sliding passage 83 is preferably provided with an enlarged portion 833 formed between the first end 831 and the second end 832 and having a width larger than the widths of the two ends 831, 832, so the sliding member 50 can smoothly slide in the sliding passage 83 and is applicable to various optical systems.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A retractable lens system comprising at least one optical element positionable at an on-axis position on a common optical axis to constitute an optical system in an operational state and movable from the operational state to a retracted state, a support member having an inclined surface that guides the optical element to move from the on-axis position to an off axis position radially off the optical axis when the retractable lens system is caused to move from the operational state to the retracted state, and a control track that is movable along the optical axis when the retractable lens system is moved between the operational state and the retracted state, the control track forming a sliding passage extending in a transverse direction substantially perpendicular to the optical axis and movably and partially receiving the optical element therein so that when the control track is set in movement along the optical axis, the optical element is caused to engage and slide along the inclined surface, wherein the control track further has top and bottom portions delimiting therebetween the sliding passage, the sliding passage having first and second ends axially offset with respect to each other, the sliding passage further forming an enlarged section between the first and second ends.

2. The retractable lens system as claimed in claim 1, wherein the support member comprises a board mounted to a fixed base that carries an optical sensor, the board having a distal end that forms the inclined surface.

3. The retractable lens system as claimed in claim 1 further comprising a housing accommodating and holding the optical element, the housing forming a slide block movably received in the sliding passage of the control track and engageable with and slidable along the inclined surface to simultaneously effect sliding movement along the sliding passage and the inclined surface.

4. The retractable lens system as claimed in claim 3, wherein the control track forms two opposite and spaced sliding passages extending in the transverse direction with respect to the optical axis, the housing comprising two spaced slide blocks respectively and movably received in the two sliding passages.

5. The retractable lens system as claimed in claim 4 further comprising a biasing element arranged between the optical element and the control track to provide a restoration force for the optical element from the off-axis position to the on-axis position.

6. A retractable lens system comprising at least a first and a second optical elements arranged on a common optical axis to constitute an optical system in an operational state and movable from the operational state to a retracted state, a support member having an inclined surface that guides the first optical element to move from an on-axis position at which the first optical element is located on the optical axis to an off-axis position radially off the optical axis, while the second optical element is moved along the optical axis, when the retractable lens system is caused to move from the operational state to the retracted state, and a control track that is movable along the optical axis when the retractable lens system is moved between the operational state and the retracted state, the control track forming a sliding passage extending in a transverse direction substantially perpendicular to the optical axis and movably and partially receives the first optical element therein so that when the control track is set in movement along the optical axis, the first optical element is caused to engage and slide along the inclined surface, wherein the control track further has top and bottom portions delimiting therebetween the sliding passage, the sliding passage having first and second ends axially offset with respect to each other, the sliding passage further forming an enlarged section between the first and second ends.

7. The retractable lens system as claimed in claim 6, wherein the support member comprises a board mounted to a fixed base that carries an optical sensor, the board having a distal end that forms the inclined surface.

8. The retractable lens system as claimed in claim 6 further comprising a housing accommodating and holding the first optical element, the housing forming a slide block movably received in the sliding passage of the control track and engageable with and slidable along the inclined surface to simultaneously effect sliding movement along the sliding passage and the inclined surface.

9. The retractable lens system as claimed in claim 8, wherein the control track forms two opposite and spaced sliding passages extending in the transverse direction with respect to the optical axis, the housing comprising two spaced slide blocks respectively and movably received in the two sliding passages.

10. A slidable lens retracting device adapted to move a retractable lens system of a camera from an operational state to a retracted state, the camera comprising a fixed base, the retractable lens system comprising at least one lens barrel movable along a common optical axis with respect to the base and a lens group unit mounted in the lens barrel and slidable from an on-axis position where the lens group unit is set on the optical axis to an off axis position where the lens group unit is located outside the optical axis by being guided by the slidable lens retracting device, the slidable lens retracting device comprising:

a support member having a proximal edge set on the fixed base of the camera and a distal edge away from the fixed base and forming an inclined surface that is inclined with respect to the common optical axis;

a sliding member formed on the lens group unit and engageable with the inclined surface of the support member for guiding the lens group unit toward the off-axis position;

a biasing element arranged between the lens group unit and the lens barrel to bias the lens group unit toward the on-axis position; and a control track formed on the lens barrel and defining a sliding passage extending in a transverse direction with respect to the optical axis and movably receiving the sliding member therein so that when the lens barrel is moved along the optical axis, the sliding member is caused to engage and slide along the inclined surface of the support member to move the lens group unit to the off axis position, wherein the control track further has top and bottom portions delimiting therebetween the sliding passage, the sliding passage having first and second ends axially offset with respect to each other, the sliding passage further forming an enlarged section between the first and second ends.

11. The slidable lens retracting device as claimed in claim 10, wherein the sliding member is cylindrical in shape and is formed on a sidewall of the lens group unit.

12. The slidable lens retracting device as claimed in claim 10, wherein the support member comprises board mounted to the fixed base.

13. The slidable lens retracting device as claimed in claim 10, wherein the biasing element comprises a spring having opposite ends fixed to the lens group unit and the lens barrel respectively.

\* \* \* \* \*